United States Patent
Sakaigawa et al.

[11] Patent Number: 6,118,512
[45] Date of Patent: Sep. 12, 2000

[54] MANUFACTURING METHOD OF A LIQUID CRYSTAL DISPLAY ELEMENT

[75] Inventors: Akira Sakaigawa, Kawasaki; Kazuyuki Kishimoto, Tenri; Mitsuhiro Koden; Teiyu Sako, both of Kashiwa, all of Japan

[73] Assignee: Sharp Kabushiki Kaisha, Osaka, Japan

[21] Appl. No.: 09/066,105

[22] Filed: Apr. 24, 1998

Related U.S. Application Data

[63] Continuation-in-part of application No. 08/728,200, Oct. 10, 1996, Pat. No. 5,812,230.

[30] Foreign Application Priority Data

Dec. 27, 1995 [JP] Japan ................................. 7-341904

[51] Int. Cl.$^7$ .......................... G02F 1/141; G02F 1/1333
[52] U.S. Cl. ........................... 349/166; 349/173; 349/188
[58] Field of Search ............................. 349/86, 166, 172, 349/188, 187, 189, 173

[56] References Cited

U.S. PATENT DOCUMENTS

| | | | |
|---|---|---|---|
| 5,654,784 | 8/1997 | Yasuda et al. | 349/172 |
| 5,812,230 | 9/1998 | Sakaigawa et al. | 349/85 |

FOREIGN PATENT DOCUMENTS

| | | |
|---|---|---|
| 0 584 963 A2 | 3/1994 | European Pat. Off. |
| 0 750 213 A2 | 11/1996 | European Pat. Off. |
| 01038724 | 9/1989 | Japan |
| 02116824 | 1/1990 | Japan |
| 02267520 | 1/1990 | Japan |
| 6-194635 | 7/1994 | Japan |
| 7-248489 | 9/1995 | Japan |
| WO 96/07123 | 3/1996 | WIPO |

OTHER PUBLICATIONS

Koden M. et al.: "Ferroelectric liquid crystal using the tau—V/sub MIN/mode" Fourth International Conference on Ferroelectric Liquid Crystals, Tokyo, Japan, Sep. 28–Oct. 1, 1993, vol. 149, No. 1–4, ISSN 0015–0193, Ferroelectrics, 1993, UK, pp. 183–192, XP000563045 * p. 185–p. 186 *.

Pirs J. et al: "Ferroelectric liquid crystal–polymer gel displays" Informachije Midem, Mar. 1993, Sloenia, vol. 23, No. 1, ISSN 0352–9045, pp. 38–42, XP002045158 *the whole document*.

"Submicrosecond Bistable Electro–Optic Switching in Liquid Crystals" (Noel A. Clark et al., Appl. Phys. Lett. 36 (11), Jun. 1, 1980, pp. 899–901).

(List continued on next page.)

*Primary Examiner*—Kenneth Parker
*Assistant Examiner*—Tai V. Duong
*Attorney, Agent, or Firm*—Dike, Bronstein, Roberts & Cushman, LLP; David G. Conlin; William J. Daley, Jr.

[57] ABSTRACT

A manufacturing method of a liquid crystal display element is provided with the steps of: arranging a pair of insulating substrates face to face with each other and bonding them to each other, each of the insulating substrates having electrodes formed thereon with an alignment film formed in a manner so as to cover the electrodes; and filling the gap between the two substrates with a mixture that is made by mixing a ferroelectric liquid crystal (FLC) composition with isotropic micro structural elements that locally give different threshold-value characteristics to liquid crystal molecules in the liquid crystal composition. With this arrangement, it is possible to provide a liquid crystal layer in which the isotropic micro structural elements are formed into a striped organization with the isotropic micro structural elements being sandwiched between smectic layers of the FLC composition. Consequently, it becomes possible to easily provide a liquid crystal display element with high quality that achieves a gray scale display suitable for practical use.

5 Claims, 9 Drawing Sheets

OTHER PUBLICATIONS

"Gray–Scale Memory of Polymer–Dispersed Surface Stabilized Ferroelectric Liquid Crystal" (H. Fujikake et al., Presentation Documents No. 3, 1994,in the 41$^{st}$ associated convention related to applied physics, p. 1120, 29p–p15).

"Polymer Dispersed Ferroelectric Liquid Crystal Device" (A. Sakaigawa et al., 44$^{th}$ spring meeting, 29aSNL9 (1997), The Japan Society of Applied Physics and Related Societies).

"Polymer/Ferroelectric Liquid Crystal Composite Device for Analogue Gray Scale" (A. Sakaigawa et al., International Display Workshop '97, SID, Nov. 19–21, 1997, p. 293).

"Gray–Scale method utilizing FLCs Containing Ultra–Fine Particles" (A. Yasuda et al., Eurodisplay '93, SID, Aug. 31–Sep. 3, 1993 pp. 59–62).

"Ferroelectric Liquid Crystal Gels Network Stabilized Ferroelectric Displays" (R.A.M. Hikmet et al., Liquid Crystas, 1995, vol. 19, No. 1, pp. 65–76).

"Polymer–Stabilized Ferroelectric Liiquid Crystal Devices with Grayscale Memory" (H. Fujikake et al., Jpn. J. Appl. Phys. vol. 36, pp. 6449–6454 part 1, No. 10, Oct. 1997).

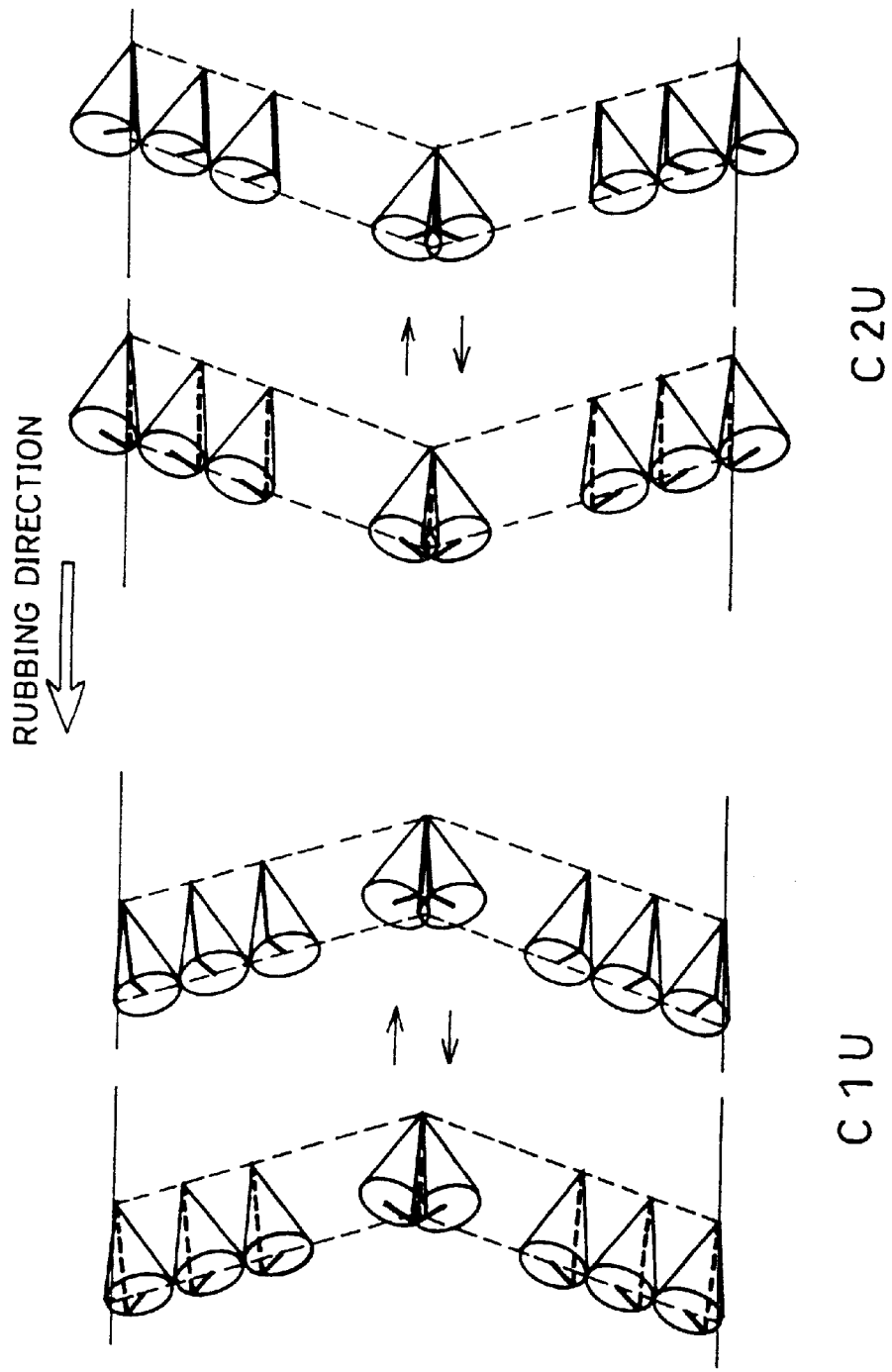

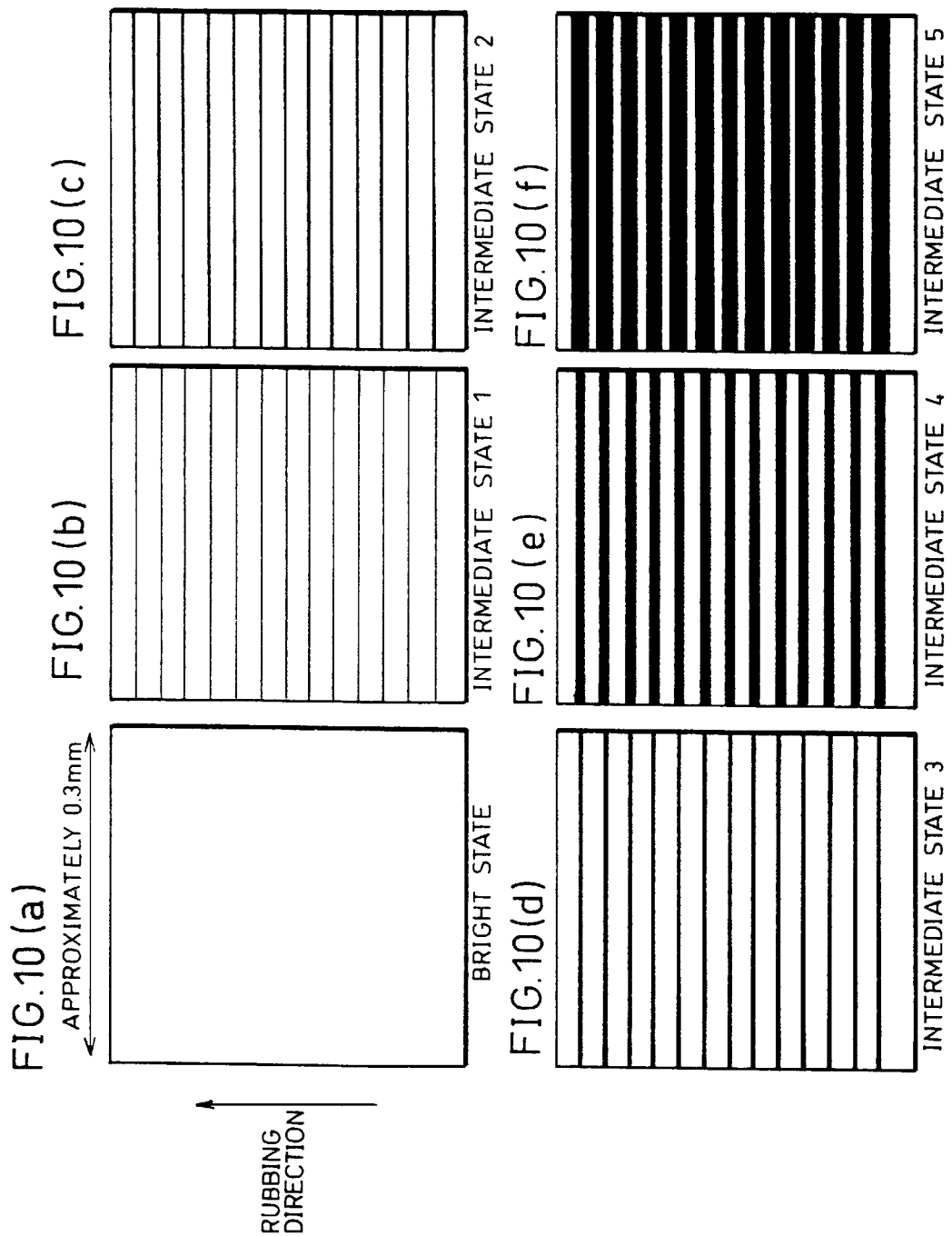

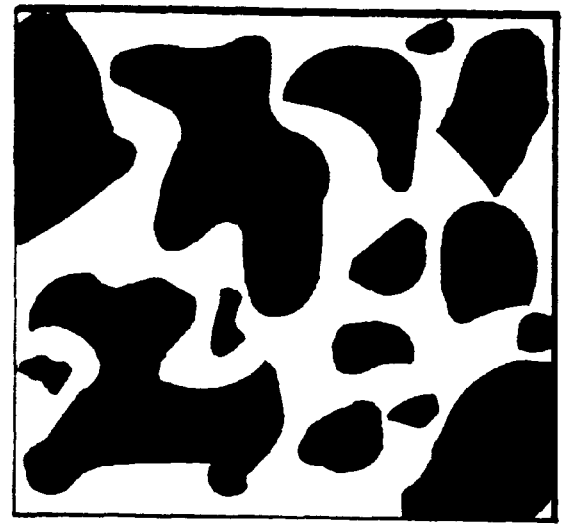
FIG.11(c) INTERMEDIATE STATE 2
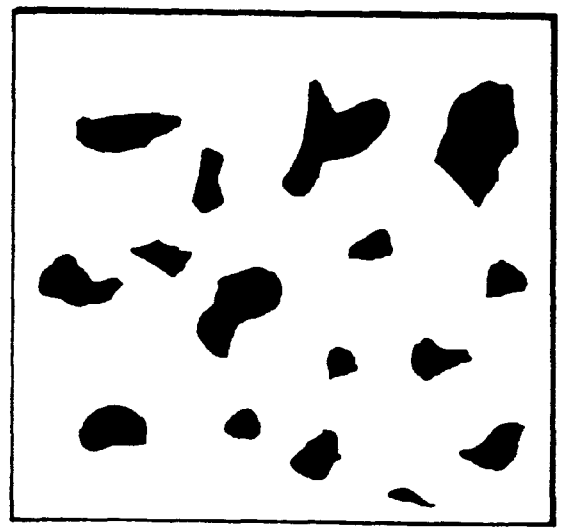
FIG.11(b) INTERMEDIATE STATE 1
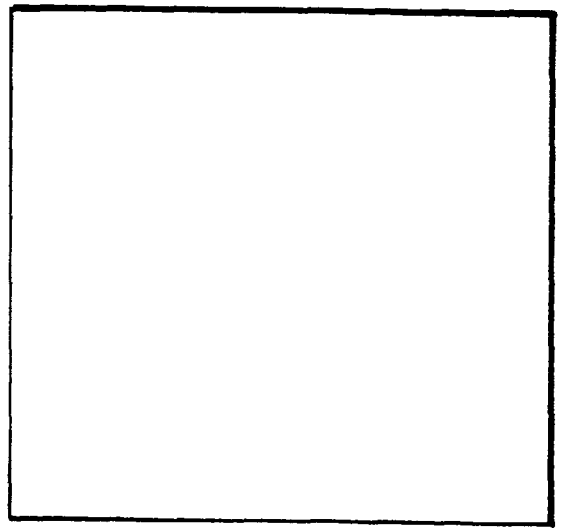
FIG.11(a) BRIGHT STATE
APPROXIMATELY 1mm

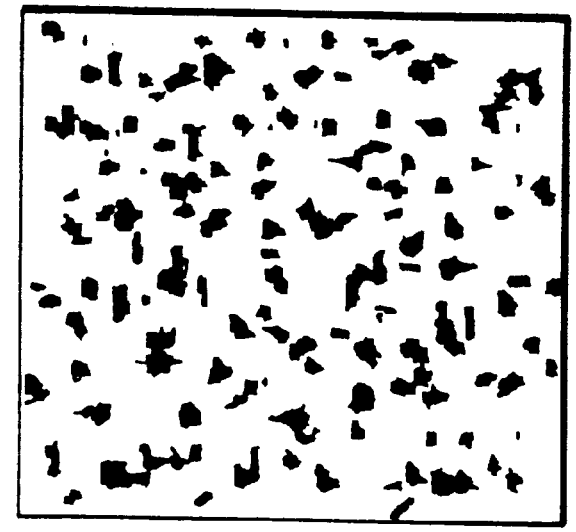
FIG.12(c) INTERMEDIATE STATE 2
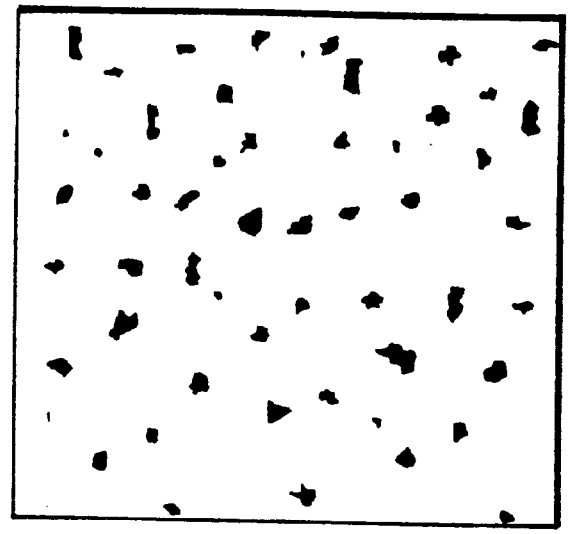
FIG.12(b) INTERMEDIATE STATE 1
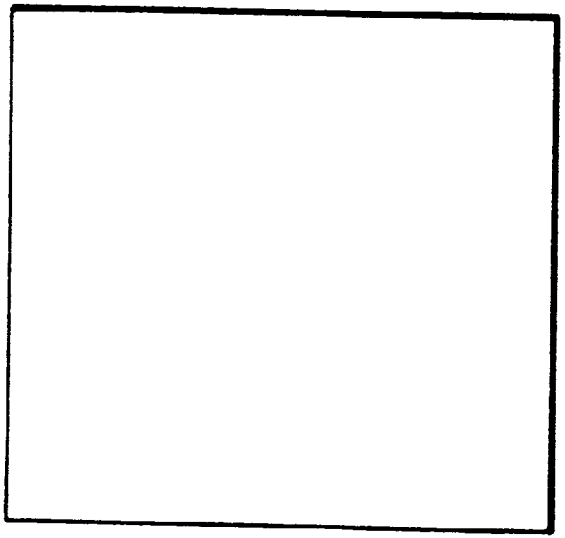
FIG.12(a) BRIGHT STATE
APPROXIMATELY 1mm

MANUFACTURING METHOD OF A LIQUID CRYSTAL DISPLAY ELEMENT

This application is a continuation-in-part of co-pending U.S. application Ser. No. 08/728,200 filed Oct. 10, 1996 (now allowed), now U.S. Pat. No. 5,812,230 the teachings of which are incorporated herein by reference.

FIELD OF THE INVENTION

The present invention relates to a manufacturing method of a liquid crystal display element which can achieve gray scale display.

BACKGROUND OF THE INVENTION

At present, liquid crystal display elements have been widely used in the field of flat-panel displays. Among these, the TN (Twisted Nematic) type display elements, which have advantages such as low driving voltage and low power consumption, have been most widely used as high-quality display elements.

However, the response speed of the TN type display elements is inferior to a great degree, as compared with the response speed of display elements of the light-emission type, such as cathode ray tube, electro-luminescent, or plasma displays. Further, the TN type display elements that have a twisted angle set in the range of 180° to 270°, that is, the so-called STN (Super Twisted Nematic) type display elements, have been developed, resulting in a drastic increase in the display capacity. However, these STN type display elements still have a limitation in improvements in the response speed.

Recently, display elements, in which each pixel of the TN-type display element is provided with a switching element, have been introduced in the market. Since most of these display elements have thin-film transistors (TFT) as the switching elements, they are referred to as the TFT-type display element, and expected to have future developments as liquid crystal display elements suitable for high-density, large-capacity and full-color display.

However, since the TFT-type display elements are manufactured by adopting semiconductor-manufacturing techniques, the available screen size is limited to as small as ten and several inches, and the cost of production is expensive. Moreover, the time-dividing capability of the TFT-type display element is said to be limited to approximately 1000 lines.

Here, a display method using ferroelectric liquid crystal has the possibility of achieving large screens not less than ten and several inches with reduced production costs, an advantage that have not been achieved by TFT-type display elements. This possibility has been suggested in "Applied Physics Letters" 36, (1980) p.899 written by N. A. Clark and S. T. Lagerwall.

The above-mentioned display method, which utilizes a chiral smectic phase, such as a chiral smectic C phase, that exhibits a ferroelectric property, is generally referred to as the surface stabilized ferroelectric liquid crystal (hereinafter, referred to as SSFLC) display method. The SSFLC display method has been studied by electric appliance makers and material makers so as to introduce it to their products, and improvements in its characteristics have been made for this purpose.

The main advantages of ferroelectric liquid crystal (hereinafter, referred to as FLC) are high-speed responsibility, good memory property and wide viewing angle. Since such advantages suggest that the SSFLC method will provide displays with large capacity, the SSFLC method is highly prospective in its practical use.

However, the main disadvantage of the SSFLC method is that since SSFLC exhibits a bistable property wherein it is basically stabilized in two orientation directions, it is difficult to achieve gray scale display.

As illustrated in FIGS. 11(a) through 11(c), in the common FLC, as the width of a pulse voltage to be applied to a pixel is increased from the bright state, domains appear and the domains change to an intermediate state 2 through an intermediate state 1. In this change, the domains expand abruptly in response to the change in the pulse width, and become larger individually. Further, since the threshold-value characteristic is constant irrespective of locations, the areas of the domains can not be desirably controlled due to factors, such as the surface state of the liquid crystal cell, the effective electric field to be applied to the liquid crystal cell and the nonuniformity in temperature. As a result, the domains expand irregularly. In this manner, the common FLC is not suitable for gray scale display.

In order to solve this problem, several methods for achieving gray scale display by utilizing FLC have been proposed.

For example, Japanese Laid-Open Patent Publication 194635/1994 (Tokukaihei 6-194635) discloses a method for forming a structural element wherein non-reactive chiral liquid crystal molecules are captured in an anisotropic three-dimensional micro structural element that has been made of a polymeric substance. With this arrangement, minute adjacent domains, which have polarization directions opposing to each other, can be stabilized by the micro structural element. Thus, the gray level can be maintained even in a non-electric field state.

As illustrated in FIGS. 12(a) through 12(c), in a liquid crystal display element containing the above-mentioned three-dimensional micro structural elements, as the width of a pulse voltage to be applied to a pixel is increased from the bright state, domains appear and the domains change to an intermediate state 2 through an intermediate state 1. In this change, the domains gradually expand in response to the change in the pulse width, and the number of domains gradually increases. Here, FIGS. 12(a) through 12(c) show the change of domains within approximately 1 mm square.

Moreover, Japanese Laid-Open Patent Publication 248489/1995 (Tokukaihei 7-248489) discloses the technique for forming minute domains by use of three-dimensional meshed synthetic resins composed of polymers. In this technique, composite elements (micro polymer) between the FLC and the resin are obtained by subjecting the prepolymer to photopolymerization under a temperature at which the FLC exhibits a nematic phase, and through this process, a striped domain structure extending in the rubbing direction is formed. Then, the area of a region to be switched is controlled by utilizing the fact that the respective domains have different threshold-value characteristics; thus, gray scale display can be obtained.

However, when the three-dimensional micro structural elements, obtained by the former technique, are adopted, the sizes of domains to be formed in the liquid crystal are randomly determined. For this reason, it is difficult to control the uniformity of the domain size, and the areas of domains cannot be desirably controlled upon application of the pulse voltage. Further, since each of the domains is larger than the actual size of a pixel (approximately, 0.3 mm square), it is practically impossible to display gray shades by using the above-mentioned technique.

Moreover, since the polymer molecules themselves, which constitute the three-dimensional (anisotropic) micro structural elements, are orientated, it is considered that the three-dimensional micro structural element is a structural element wherein it is orientated together with the liquid crystal structural element or liquid crystal. For this reason, when micro structural elements with a high concentration (5 to 60% by weight) are formed in the liquid crystal layer, a great interaction occurs between the micro structural elements and the FLC molecules. Then, this interaction gives adverse effects on the switching operation to a great degree, thereby resulting in difficulty in the high-speed driving of the FLC.

As described above, the former technique is not suitable for high-precision display. Furthermore, the presence of three-dimensional micro structural elements with a higher concentration not only causes light scattering, but also makes a disturbance in the uniform oriented state of the FLC molecules, thereby reducing the contrast of display images.

On the other hand, in the latter technique, since each of the long narrow striped domains has a size of approximately 100 μm, it is too large to actually apply to matrix-type display elements. Further, since the striped domains exist inside a pixel at random, it is difficult to obtain the same gray level in a plurality of regions. Therefore, it is also difficult for the latter technique to actually provide gray scale display.

As described above, none of the above-mentioned techniques provide a structure that is capable of controlling the areas of switching domains uniformly over a wide range; therefore, it is impossible to display gray shades over a wide range, even though gray shades can be locally obtained.

SUMMARY OF THE INVENTION

The present invention has been made in order to solve the above-mentioned problems, and its objective is to provide a manufacturing method of a liquid crystal display element that allows a gray scale display suitable for practical use by minimizing the domain size to a great degree as compared with the pixel size and making the domain distribution uniform over a wide range.

In order to achieve the objective, the manufacturing method of a liquid crystal display element of the present invention is provided with the steps of: arranging a pair of insulating substrates face to face with each other and bonding them to each other, each of the insulating substrates having electrodes formed thereon with an alignment film formed in a manner so as to cover the electrodes; and filling a gap between the two substrates with a mixture that is made by mixing a liquid crystal composition with isotropic micro structural elements that locally give different threshold-value characteristics to liquid crystal molecules in the liquid crystal composition.

In the above-mentioned manufacturing method, the liquid crystal layer is formed by using the mixture of the liquid crystal composition and the isotropic micro structural elements; therefore, in the liquid crystal layer, the isotropic micro structural elements locally impart different threshold-value characteristics to the liquid crystal. Consequently, the uniformity of the domain size can be controlled, and upon application of a pulse voltage, the areas of the domains can be desirably controlled.

Since it is not necessary to form isotropic micro structural elements by polymerizing a monomer between the paired substrates, the liquid crystal composition is free from chemical change that would take place due to the heat and light irradiation during the polymerization. Further, since no polymerization is required, there is no unreacted matter resulted from the polymerization. Consequently, it is possible to prevent the purity of the liquid crystal composition from reducing due to the unreacted matter. In addition, since no process for forming isotropic micro structural elements is incorporated into the manufacturing processes of the liquid crystal element, the production of the liquid crystal display element can be simplified.

Therefore, it becomes possible to easily obtain a liquid crystal display element with high quality that allows a gray scale display suitable for practical use.

In the above-mentioned manufacturing method, with respect to the isotropic micro structural elements, isotropic micro structural elements which are formed into a striped organization by being mixed with the liquid crystal composition are preferably used; thus, the domains in the liquid crystal layer has a fine formation in accordance with the isotropic structural elements distributed with the striped pattern.

Moreover, in the above-mentioned manufacturing method, a polymer, which is made by polymerizing at least one kind of monofunctional monomer, is preferably used as the isotropic micro structural elements. Thus, in this polymer, molecules are distributed at random so that the isotropic micro structural elements are easily formed. Since the isotropic micro structural elements has the property of locally imparting the threshold-value characteristics with ease as described earlier, it is possible to control the uniformity of the domain size and also to desirably control the area of the domain upon application of a pulse voltage.

Furthermore, it is preferable to heat the mixture that has been filled between the paired substrates to a temperature that allows the liquid crystal composition to exhibit the isotropic phase. With this arrangement, even in a case when it is hard to form the striped organization, such as a case of a low concentration of the isotropic micro structural elements (the polymer), it is possible to distribute the isotropic structural elements in the striped pattern.

More preferably, an FLC composition may be used as the liquid crystal composition; thus, the isotropic micro structural elements are formed into a striped organization in which the isotropic micro structural elements are sandwiched between smectic layers in the FLC composition. This organization makes it possible to easily control the domains in the FLC composition as described earlier. Therefore, it becomes possible to achieve a gray scale display suitable for practical use of an FLC display element.

For a fuller understanding of the nature and advantages of the invention, reference should be made to the ensuing detailed description taken in conjunction with the accompanying drawings.

BRIEF DESCRIPTION OF THE DRAWINGS

FIG. 6 is an explanatory drawing that shows an orientated state of liquid crystal molecules in the smectic layers in FIG. 5.

FIG. 7($b$) is an explanatory drawing that shows a liquid crystal layer having a smectic-layer structure; and FIG. 7($c$) is an explanatory drawing that shows a striped structure that has been formed by the polymer in the liquid crystal layer of FIG. 7($b$).

FIGS. 10($a$) through 10($f$) are explanatory drawings that show the change of domains in response to the pulse width as a result of application of the driving voltage of FIG. 9 to the liquid crystal cell of Example 3 of the present invention: FIG. 10($a$) shows the bright state of the liquid crystal cell; FIG. 10($b$) shows one example of an intermediate state of the liquid crystal cell; FIG. 10($c$) shows another intermediate state of the liquid crystal cell; FIG. 10($d$) shows still another intermediate state of the liquid crystal cell; FIG. 10($e$) shows still another intermediate state of the liquid crystal cell; and FIG. 10($f$) shows still another intermediate state of the liquid crystal cell.

FIGS. 11($a$) through 11($c$) are explanatory drawings that show the change of domains in a commonly-used FLC composition: FIG. 11($a$) shows the bright state of the FLC composition; FIG. 11($b$) shows one example of an intermediate state of the FLC composition; and FIG. 11($c$) shows another intermediate state of the FLC composition.

FIGS. 12($a$) through 12($c$) are explanatory drawings that show the change of domains in a conventional liquid crystal display element that has three-dimensional micro structural elements: FIG. 12($a$) shows the bright state of the liquid crystal display element; FIG. 12($b$) shows one example of an intermediate state of the liquid crystal display element; and FIG. 12($c$) shows another intermediate state of the liquid crystal display element.

DESCRIPTION OF THE EMBODIMENTS

Referring to FIGS. 1 through 10, the following description will discuss embodiments of the present invention.

EMBODIMENT 1

Figure 1:
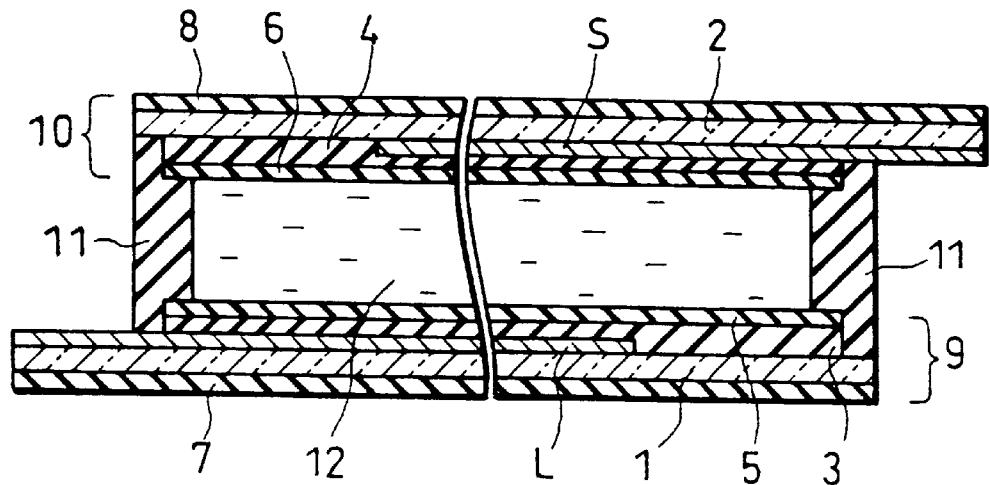
FIG. 1 is a cross-sectional view showing a construction of a liquid crystal cell in accordance with one embodiment of the present invention.

The liquid crystal display element (hereinafter, referred to as the liquid crystal cell) of the present embodiment has a structure as illustrated in FIG. 1. Here, FIG. 1 shows the structure of a liquid crystal cell corresponding to one pixel.

The liquid crystal cell is provided with two substrates 1 and 2 that have a light-transmitting property and an insulating property. The substrates 1 and 2 are normally made of glass substrates having a high light-transmitting property.

Electrodes L and S, each of which is made of a transparent dielectric film, are formed on the respective surfaces of the substrates 1 and 2. The electrodes L and S are formed by using materials, such as $InO_3$, $SnO_2$, and ITO (Indium Tin Oxide), that are formed into a predetermined pattern by the CVD (Chemical Vapor Deposition) method or the sputtering method. The thickness of each of the electrodes L and S is preferably set in the range of 50 to 200 nm.

Transparent insulating films 3 and 4, each of which has a thickness of 50 to 200 nm, are formed on the respective electrodes L and S. Inorganic thin-films made of materials, such as $SiO_2$, $SiN_X$, $Al_2O_3$, and $Ta_2O_5$, or organic thin films made of materials, such as polyimide, photoresist resin and high molecular liquid crystal, are used as the insulating films 3 and 4.

The insulating films 3 and 4, when made of inorganic thin-films, are formed by methods, such as the vapor deposition method, the sputtering method, the CVD method and the solution-applying method. On the other hand, the insulating films 3 and 4, when made of organic thin-films, are formed by applying a solution of an organic substance or its precursor using the spinner coating method, the dip coating method, the screen printing method, the roll coating method or other methods, and by setting the coat under predetermined setting conditions (heat, light irradiation, etc.). Further, the formation of the insulating films 3 and 4 made of organic thin-films may also be carried out by the vapor deposition method, the sputtering method, the CVD method, the LB (Langumuir-Blodgett) method or other methods.

Here, it is possible to omit the insulating films 3 and 4.

Alignment films 5 and 6 are formed with a thickness of 10 to 100 nm on the insulating films 3 and 4. In the case when the insulating films 3 and 4 are omitted, the alignment films 5 and 6 are directly formed on the electrodes L and S.

The alignment films 5 and 6, when made of inorganic thin-films, are formed by a prior art film-forming method wherein silicon oxide is used. The film-forming method is, for example, an oblique evaporation method, a rotation evaporation method, (a rotation oblique evaporation method) or other methods. The alignment films, 5 and 6, when made of organic thin-films, are formed by using materials, such as nylon, polyvinyl alcohol and polyimide, and a rubbing process is normally applied to the upper surface thereof.

Moreover, the alignment films 5 and 6 may be formed by using high molecule liquid crystal or LB films. In this case, an alignment process, which uses a magnetic-field applying method, a spacer edge method, or other methods, is applied thereto. Furthermore, the alignment films 5 and 6 may also be made by forming $SiO_2$, $SiN_X$, or other materials as films by using the vapor deposition method, the sputtering method, the CVD method or other methods, and by applying a rubbing process to the upper surface thereof.

Polarization films 7 and 8 are formed on the respective surfaces opposite to the surfaces having the electrodes L and S in the substrates 1 and 2. The polarization films 7 and 8 are installed so as to optically recognize the switchover of light axes in the liquid crystal that occurs when voltage is selectively applied to the electrodes L and S.

An electrode substrate 9 is constituted by the above-mentioned substrate 1, the electrode L, the insulating film 3, the alignment film 5 and the polarization film 7. On the other hand, an electrode substrate 10 is constituted by the above-mentioned substrate 2, the electrode S, the insulating film 4, the alignment film 6 and the polarization film 8.

The electrode substrates 9 and 10 are bonded to each other through a seal member 11 in a manner so as to face with a predetermined interval in between. The space, formed between the electrode substrates 9 and 10, is filled with a mixture containing an FLC (Ferroelectric Liquid Crystal) component; thus a liquid crystal layer 12 is formed.

Figure 2:
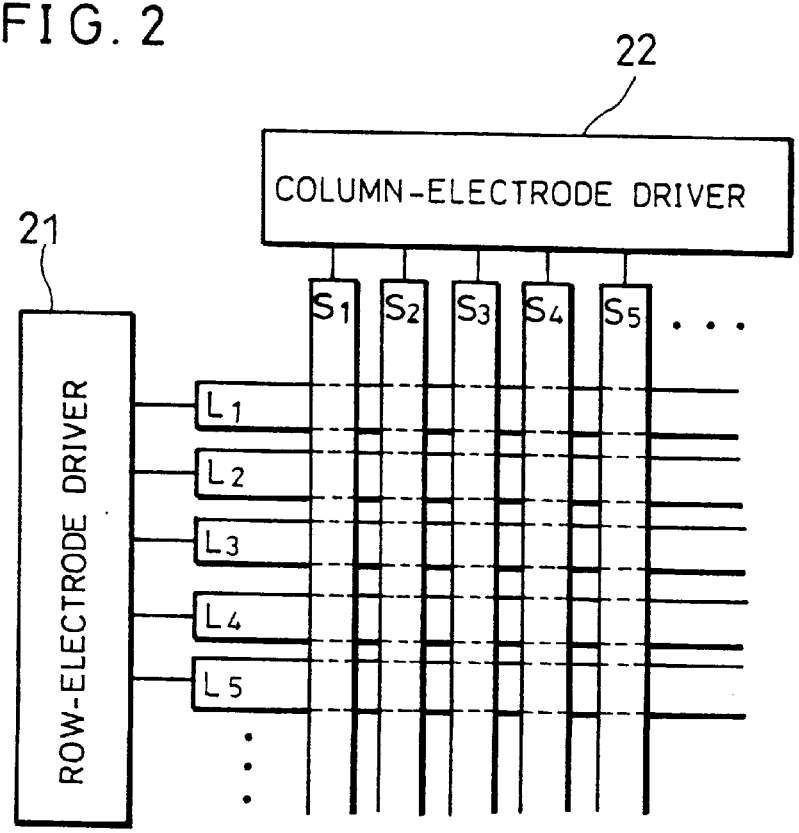
FIG. 2 is a block diagram showing arrangements of electrodes and electrode drivers in the liquid crystal cell of FIG. 1.

As illustrated in FIG. 2, in order to arrange a plurality of pixels in a liquid crystal cell of the present embodiment, the plural electrodes L ($L_1$, $L_2$, . . . etc.) are aligned in parallel with one another in the row direction, and the plural electrodes S ($S_1$, $S_2$, . . . etc.) are also aligned in parallel with one another in the column direction in a manner so as to orthogonally intersect the electrodes L. With the electrode arrangement having such a matrix format, a pixel is formed at each portion at which the electrode L and the electrode S intersect each other. Thus, each pixel has a construction in which the liquid crystal layer 12 is sandwiched by the electrodes L and S. Therefore, a number of pixels are formed by installing a number of the electrodes L and S, which makes it possible to provide display with a large capacity.

The electrodes L are connected to a row-electrode driver 21, and the electrodes S are connected to a column-electrode driver 22. The row-electrode driver 21, which functions as a voltage-applying means, successively applies to the electrodes L selection voltages (column voltages) for selecting the electrodes L. On the other hand, the column-electrode driver 22, which also functions as a voltage-applying means, applies to the electrodes S voltages (row voltages) for switching the operational states of the liquid crystal layer 12.

Pulse voltages are applied to the liquid crystal layer 12 by the row-electrode driver 21 and the column-electrode driver 22. The pulse voltages are allowed to have desired waveforms in which the width (duration) and the height (voltage level) are variable, by combining the row voltage and the column voltage.

Here, the above-mentioned liquid crystal layer 12 contains isotropic micro structural elements that are made of an FLC composition and a polymer. The isotropic micro structural elements, which will be described in detail in Examples 1 through 3, are formed by polymerizing a photopolymerizable monomer (hereinafter, referred to simply as a monomer) with irradiation of light.

Figure 3:
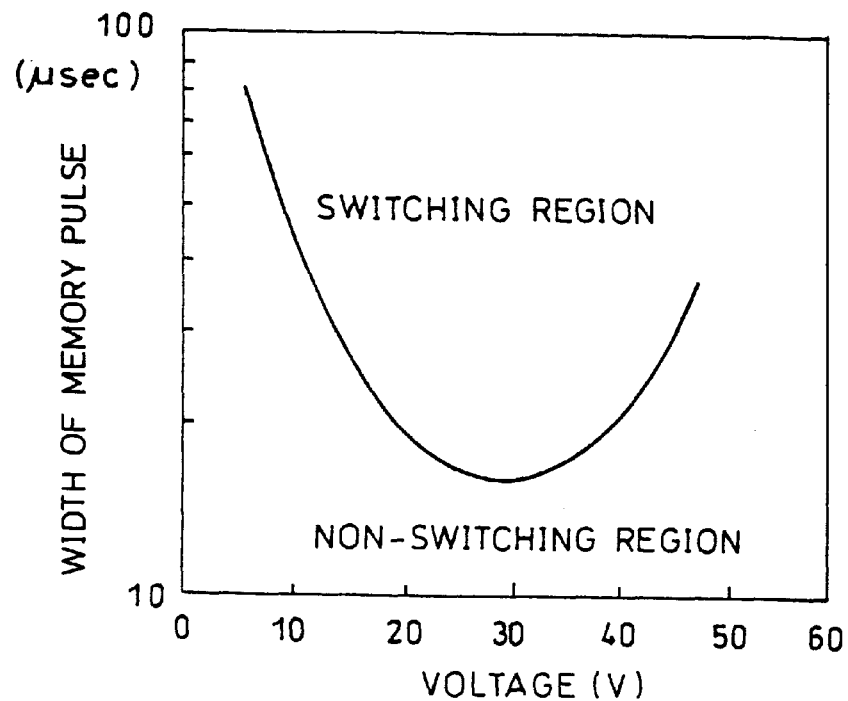
FIG. 3 is a graph that indicates the voltage vs. memory-pulse width characteristics of a pulse voltage that is applied to the liquid crystal cell of FIG. 1.
Figure 4:
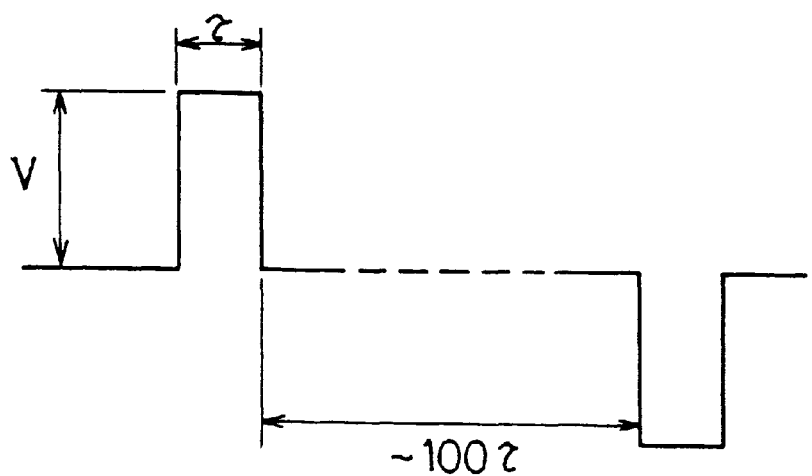
FIG. 4 is a waveform diagram that indicates a waveform of a pulse voltage that is applied upon measuring the operational characteristics of the liquid crystal cell of FIG. 1.

The FLC composition, used in the present embodiment of the invention, exhibits a negative dielectric anisotropy, and also exhibits a voltage vs. memory-pulse width characteristic which has a minimum value as shown in FIG. 3, upon application of a pulse voltage. The pulse voltage, applied at this time, is a voltage which has a waveform with different polarities at predetermined intervals, as shown in FIG. 4. Additionally, the memory-pulse width, which is indicated on the y-axis in the voltage vs. memory-pulse width characteristic of FIG. 3, is a pulse width that is required for allowing liquid crystal molecules to have a 100% switching capability upon application of a certain pulse voltage.

The FLC composition, which exhibits the above-mentioned characteristic, allows to select a switched state on the low-voltage side and also to select a non-switched state on the high voltage side, on condition that the pulse width is made constant. With this arrangement, the higher the voltage, the higher degree of stability in the non-switched state, that is, in the holding state, is obtained, and consequently, it becomes possible to reduce fluctuations in liquid crystal molecules to a great degree. Therefore, it is possible to reduce leakage of light by using the above-mentioned FLC composition.

In contrast, in a commonly-used FLC composition, the pulse width varies virtually in inverse proportion to the voltage, thereby exhibiting a voltage vs. memory-pulse width characteristic which does not have a minimum value. Therefore, such an FLC composition only allows to select a non-switched state on the low-voltage side and to select a switched state on the high-voltage side, on condition that the pulse width is made constant. The non-switched state on the low-voltage side tends to cause fluctuations in liquid crystal molecules, thereby resulting in an increased leakage of light and degradation in contrast.

Figure 5:
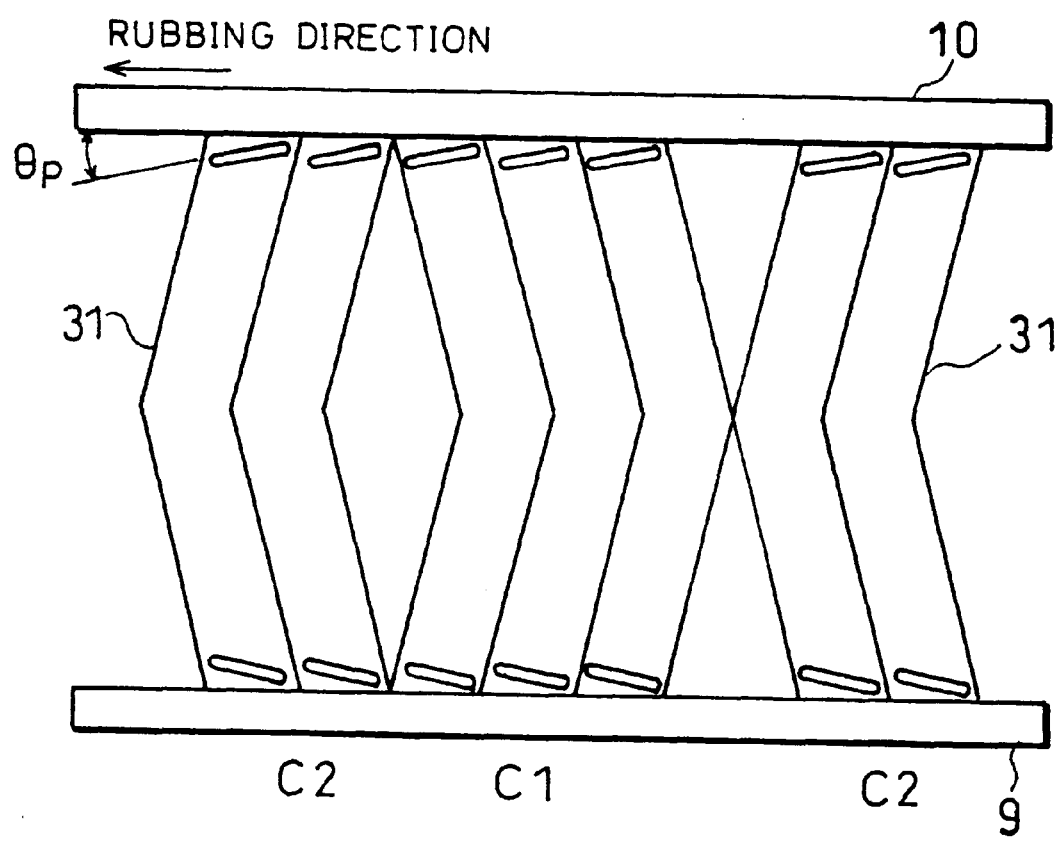
FIG. 5 is an explanatory drawing that shows smectic layers that is formed to have a chevron structure in the liquid crystal cell of FIG. 1.

Further, as illustrated in FIG. 5, the FLC composition has a chevron structure wherein the smectic layers 31 are bent at their center portions between the electrode substrates 9 and 10. Such a chevron structure includes C2 orientation wherein the bends take place in the same direction as the rubbing direction and C1 orientation wherein the bends take place in a direction opposite to the rubbing direction. As illustrated in FIG. 6, in the C1 orientation and the C2 orientation, liquid crystal molecules are uniformly orientated to form C1U (C1-Uniform) orientation and C2U (C2-Uniform) orientation.

In the case of C1 orientation, liquid crystal molecules in the vicinity of the electrode substrates 9 and 10 are allowed to easily move since they are hardly affected by the interfaces between the electrode substrates 9·10 and the smectic layers 31. For this reason, since liquid crystal molecules in the smectic layers 31 are all allowed to move, switching delay tends to occur.

In contrast, in the case of C2 orientation, liquid crystal molecules in the vicinity of the electrode substrates 9 and 10 are not allowed to move, or hardly allowed to move, since they are affected by the interfaces between the electrode substrates 9·10 and the smectic layers 31. For this reason, in the smectic layers 31 only the liquid crystal molecules that are located at portions except for the portions in the vicinity of the interfaces, are allowed to move; therefore, it is possible to increase the switching speed as compared with the case of C1 orientation.

Thus, in the present liquid crystal cell, it is preferable for the smectic layers 31 to have C2 orientation (C2U orientation) in a unified manner. Further, a pre-tilt angle θp is imparted to the liquid crystal molecules so that each molecule tilts toward the side on which the smectic layers 31 with C2 orientation are bent.

With respect to the monomer, for example, acrylate, methacrylate or epoxy materials are used. These are monofunctional compounds each of which has one polymerizable portion in each molecule, and also has a polymerization property upon irradiation with light.

Each of the above-mentioned monomers may be used independently. Further, each of the above-mentioned monomer may have at least one asymmetric carbon in each molecule and also have an optically active property. Further, in the case when two or more kinds of the above-mentioned monomers are used in a mixed manner, at least one kind of the monomer molecules may be optically active molecules. In the case of two kinds of the monomers in a mixed manner, a polymer or an oligomer may be added thereto, if necessary.

The above-mentioned mixture preferably contains a monomer in the range of 0.1 to 10% by weight, and more preferably contains a monomer in the range of 0.1 to 5% by weight, although the content depends on the characteristics of a desired liquid crystal cell. In the case of the content of a monomer less than 0.1% by weight, the formation of the isotropic micro structural elements is insufficient, thereby failing to obtain a striped structure. Moreover, in the case of the content of a monomer not less than 10% by weight, disturbances in the orientation and degradation in the responsibility tend to occur.

In the monomers including an optically active compound and an optically non-active compound, the content of the optically active compound is preferably set in the range of 50 to 100% by weight. In the case of a content less than 50% by weight, there would be the possibility that local changes in the threshold-value characteristics are not raised in a sufficient manner in the liquid crystal layer 12.

A photopolymerization initiator is added to the above-mentioned mixture. A material, such as Irgacure-184, Irgacure-651, Irgacure-907, Tagrocure-1173, Tagrocure-1116 or Tagrocure-1959 (all manufactured by Merck & Co., Inc.) is used as the initiator. The mixing rate of the initiator is preferably set approximately in the range of 0.1 to 3% by weight with respect to the mixture. This is because insufficient initiator fails to properly initiate the reaction, while too much initiator leaves its decomposed matters as impurities even when the reaction is finished.

Although the method for charging the mixture into the liquid crystal cell is not particularly limited, the following methods are, for example, used: One is a method in which after the electrode substrates 9 and 10 have been bonded to each other through the seal member 11, the mixture is injected thereto by a vacuum injection method or other methods. The other is a method in which after having coated one of the substrate 9 (or 10) with the mixture by using a printing method or other methods, the other substrate 10 (or 9) is bonded thereto by the seal member 11.

Additionally, when the electrode substrates 9 and 10 are bonded to each other, spacers, not shown, may be sprayed between the electrode substrates 9 and 10 in order to maintain the thickness (cell gap) of the liquid crystal layer 12 constant. The diameter of each spacer is set in the range of 1 to 30 μm, and more preferably set in the range of 1 to 5 μm.

The following description will discuss a treatment process of the liquid crystal layer 12.

First, a mixture is produced by mixing a composition (FLC composition) exhibiting a ferroelectric liquid crystal phase as a liquid crystal composition with a monomer, and the mixture is charged between the electrode substrates 9 and 10. Next, the monomer is polymerized by irradiating the mixture with light, such as ultraviolet light. In this case, the liquid crystal cell is heated up to a temperature at which the FLC composition exhibits a nematic phase or an isotropic phase, and then is cooled off gradually to room temperature in a sufficient period of time.

Figure 7A:
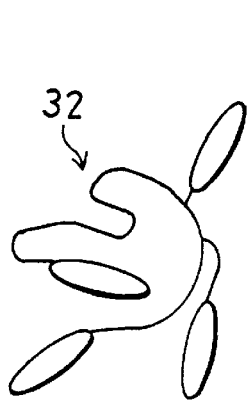
FIG. 7($a$) is an explanatory drawing that shows a polymer that is produced in the liquid crystal cell of FIG. 1.
Figure 7B:
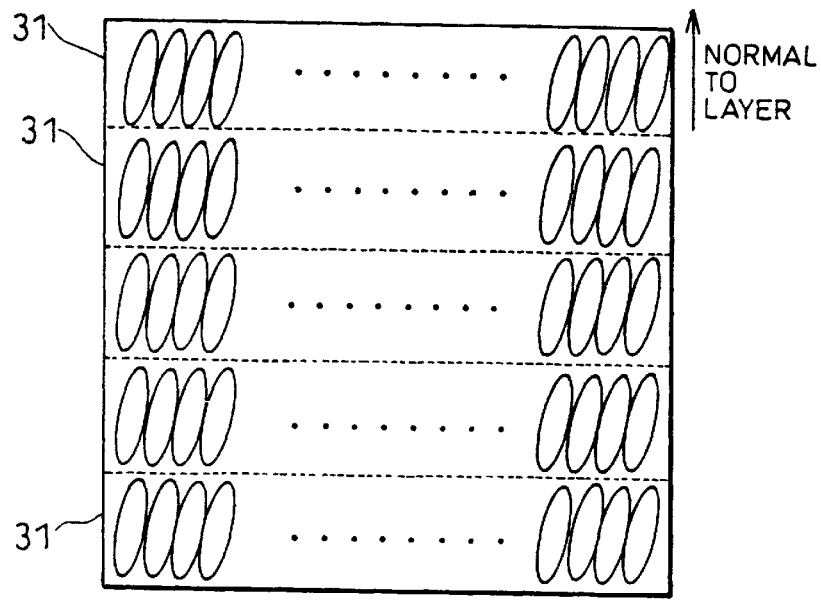
Figure 7C:
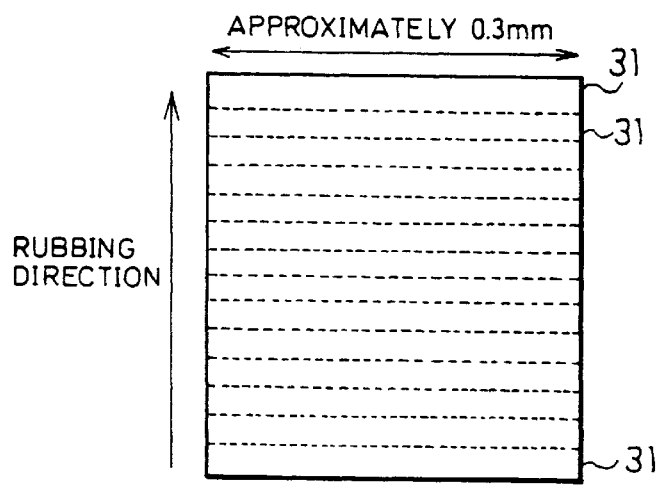

In the liquid crystal cell thus obtained, it was observed under a polarization microscope that there was a structure having a number of fine stripes that were aligned in a direction perpendicular to the normal to the smectic layers 31, as indicated by dashed lines in FIG. 7(c). When a monomer is polymerized under a system, such as the nematic phase or the isotropic phase, which has great thermal fluctuations, the polymer 32 itself, thus produced, is not orientated together with the liquid crystal molecules as illustrated in FIG. 7(a). More specifically, the molecules of the polymer 32 are distributed at random, with each molecule having no anisotropy. Thus, the organization (structural elements) with isotropy is formed.

During the cooling process, such anisotropic micro structural elements are dispersed between the smectic layers 31 in a sandwiched manner, as illustrated in FIG. 7(b). Thus, a striped structure is formed with pitches (10 to 20 μm), as illustrated in FIG. 7(b).

When a pulse voltage, as shown in FIG. 4, is applied to the liquid crystal cell in which the above-mentioned striped structure is formed, fine domains corresponding the above-striped structure are generated. At least either the areas or the number of the domains is controlled by at least either the height V or the width τ of the pulse voltage.

When the monomer is polymerized under a temperature at which the FLC composition exhibits a phase with a high degree of order, such as a smectic phase, the polymer 32 itself, thus produced, is orientated by a restraint that is exerted on the liquid crystal molecules. For this reason, the polymer 32 is wholly dispersed in the mixture, and no striped structure is formed. Even in such a state, since local threshold-value characteristics have changed in the periphery of the polymer 32, gray scale display is available, if limited to narrow regions. However, the expansion of domains with respect to the height or width of the pulse voltage takes place at random. For this reason, it is difficult to control the expansion of domains so that it becomes uniform in any pixel in the case when a large display area is required.

Therefore, in the present example, it is essential to subject the monomer to photopolymerization under a high temperature. With this arrangement, the isotropic three-dimensional micro structural elements are formed in a striped manner. Further, with this striped structure, the expansion of domains, which is determined by the height or width of the pulse voltage, is regularly made uniform over a wide range. Moreover, as illustrated in FIG. 7(c), the striped structure is formed in a sufficiently fine fashion in the range of 0.3 mm square that forms a pixel; thus, display with gray shades is available in each pixel.

Therefore, the present liquid crystal cell, which contains the FLC composition, easily makes it possible to carry out gray scale display in an analog form by adopting the above-mentioned arrangement. Moreover, the combination of this liquid crystal cell with color filters also easily makes it possible to carry out full-color gray scale display in an analog form.

Additionally, in the present embodiment, the isotropic micro structural elements are formed by subjecting a monomer to photopolymerization; however, the isotropic micro structural elements may also be formed by using monomers that are thermally polymerized at temperatures above the nematic phase.

EXAMPLE 1

The liquid crystal cell of the present example is manufactured as follows:

Glass substrates are used as the substrates 1 and 2, and electrodes L and S, made of ITO, are formed on the respective substrates 1 and 2 with a thickness of 1000 Å, and insulating films 3 and 4, made of $SiO_2$, are formed thereon by the spin coat method with a thickness of 1000 Å. Next, alignment films 5 and 6, made of polyimide, are applied thereon with a thickness of 500 Å, and a rubbing process is applied to the surfaces thereof.

Successively, spacers are applied to the alignment films 5 and 6 so as to provide a cell gap of 1.5 μm, and the surrounding portions of the substrates 1 and 2 are bonded to each other by seal member 11. Further, mixture A, which is made by mixing an FLC composition with a monomer as shown in Table 1, is injected between the electrode substrates 9 and 10.

The monomer, which has a structure as shown in Table 1, has no liquid crystal property, and is a liquid at room temperature. Since this monomer, when polymerized, does not exhibit liquid crystal properties and is freezed to glass state, it is easily distributed into a striped structure in a sandwiched manner between the smectic layers 31.

Additionally, the monomer that is to be mixed with the FLC composition may be a monomer having another structure, as long as it has the above-mentioned properties.

TABLE 1

| Mixture | | A (wt %) | B (wt %) | C (wt %) |
|---|---|---|---|---|
| FLC Comp. | SCE-8 (Merck & Co., Inc.) | 98 | 95 | 99 |
| Photopolymerization Monomer | | 5 | 2 | 1 |

Then, the liquid crystal cell is heated to 90° C. on a hot plate, and is irradiated with ultraviolet light that has a wavelength of 360 nm and an intensity of 4 mW/cm² for five minutes. After irradiation with the ultraviolet light, the heating process of the hot plate is stopped, and it is cooled off down to room temperature.

In the liquid crystal cell thus obtained, it was observed under a polarization microscope that there was a structure having a number of fine stripes that were aligned in a direction perpendicular to the normal to the layers, as illustrated in FIG. 7(c).

Measurements were carried out on the transmittance in response to the change in the pulse voltage by applying the pulse voltage, shown in FIG. 4, to the liquid crystal cell. Upon measurements, the pulse voltage, which had a constant width τ (70 μsec), was applied with the height V being varied, and the resulting intensity of transmitted light was detected by a photodiode.

Figure 8:
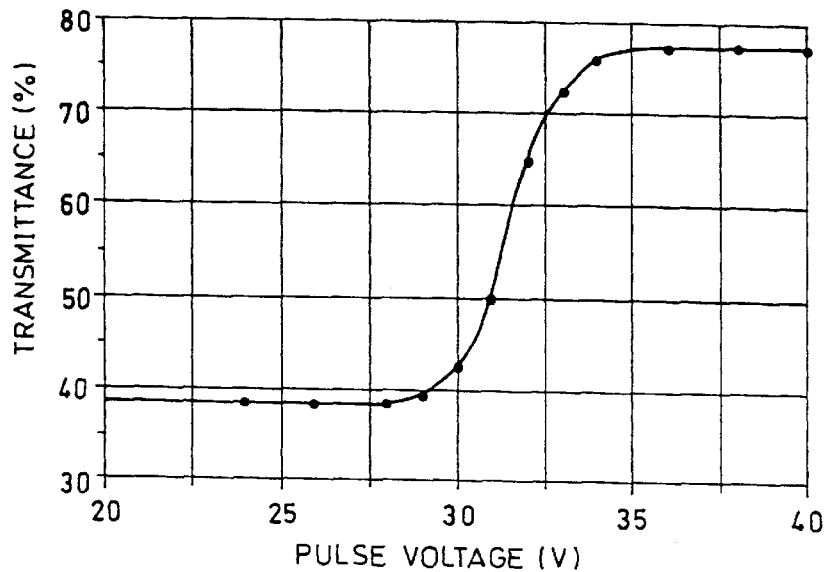
FIG. 8 is a graph that indicates pulse-voltage vs. transmittance chacteristics that were measured in the liquid crystal cell in accordance with Example 1 of the present invention.

As a result, as illustrated in FIG. 8, characteristics in which the transmittance changes gradually were obtained; thus, it was confirmed that gray scale display was available by using the present liquid crystal cell.

As described above, in the liquid crystal cell of the present example that has a monomer concentration (content) of 5% by weight, it is possible to form a striped structure by allowing the monomer to be polymerized under a temperature at which the FLC composition exhibits a nematic phase.

Additionally, in the present example, the heating temperature upon irradiation with ultraviolet light was set to 90° C. at which the FLC composition exhibits a nematic phase (N phase). However, when another liquid crystal cell was made by setting the heating temperature upon irradiation with ultraviolet light to 100° C. at which the FLC composition exhibits an isotropic phase (Iso phase) with the other conditions being set in the same manner as those of the present example, the same striped structure as the liquid crystal cell of the present example, as illustrated in FIG. 7(c), was confirmed.

EXAMPLE 2

In the present example, liquid crystal cells were manufactured through the same processes by using two kinds of mixtures B and C, shown in Table 1, instead of using the mixture A in Example 1.

Although observation was carried out on the two kinds of liquid crystal cells thus obtained by using a polarization microscope, there was no structure having a number of fine stripes that were aligned in a direction perpendicular to the normal to the layers in the liquid crystal layer 12.

Next, these liquid crystal cells were again heated to 100° C. so as to allow the FLC composition to exhibit a sufficient isotropic phase, and then they were cooled off.

In these liquid crystal cells thus obtained, it was observed under a polarization microscope that there was a structure having a number of fine stripes that were aligned in a direction perpendicular to the normal to the layers in the liquid crystal layer 12.

As described above, in the case when the concentration of the monomer in the mixture was low, although merely applying the cooling process after exposure does not allow the striped structure to be formed, it was found that a striped structure was formed by applying thereafter the re-heating process up to the temperature at which the FLC composition was allowed to exhibit an isotropic phase.

Additionally, in the present example, the heating temperature upon irradiation with ultraviolet light was set to a temperature at which the FLC composition exhibits a nematic phase. However, even when another liquid crystal cell was made by setting the heating temperature upon irradiation with ultraviolet light to a temperature at which the FLC composition exhibits an isotropic phase, it was sometime difficult to form a striped structure only by applying the cooling process after irradiation with ultraviolet light in the case when the monofunctional monomer had a low concentration, in the same manner as the manufacturing process of the present example. Even in such a case, when, after having applied the irradiation process with ultraviolet light and the following cooling process in the same manner as the present example, the liquid crystal layer 12 was re-heated to a temperature at which the FLC composition exhibits an isotropic phase, it was confirmed that the resulting isotropic micro structural elements were distributed in a striped manner.

EXAMPLE 3

Figure 9:
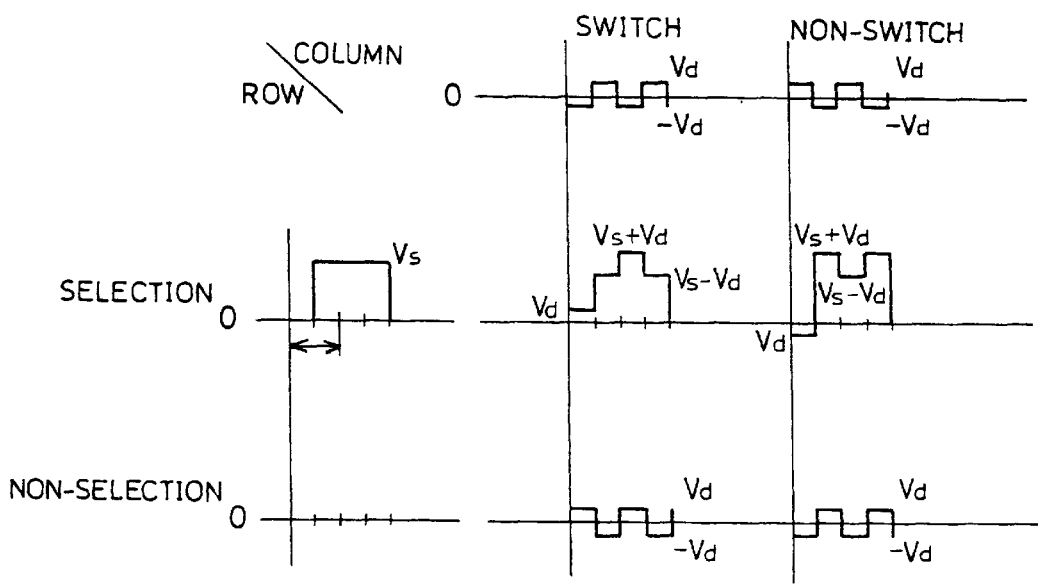
FIG. 9 is a waveform diagram that shows a waveform of a driving voltage that is applied to a liquid crystal cell in accordance with Example 3 of the present invention.

In the present example, the operation of the liquid crystal cell that was manufactured in Example 1 is confirmed by applying a driving voltage as shown in FIG. 9.

The driving voltage is applied as the difference between a voltage to be applied to the electrode S (column electrode) and a voltage to be applied to the electrode L (row electrode). More specifically, the voltage ($\pm V_d$), which is applied to the electrode S, includes a pulse that indicates a switched state and a pulse that indicates a non-switched state having an inverted polarity to the former pulse. On the other hand, the voltage ($V_s$) that is applied to the electrode L (row electrode) in a selected state, and in a non-selected state, no pulse is applied thereto. The above-mentioned voltages $V_d$ and $V_s$ are respectively set to 5 V and 30 V. Further, the frame frequency is set to 60 Hz.

Such a driving voltage was applied with the pulse width τ being changed (increased), and the resulting changes of domains in the liquid crystal layer 12 were observed. Consequently, the areas of domains were controlled in response to the change in the pulse width τ as shown from the bright state in FIG. 10(a) to intermediates states 1 through 5 in FIGS. 10(b) through 10(f); therefore, it was confirmed that gray scale display was available.

COMPARATIVE EXAMPLE 1

In the present comparative example, a liquid crystal cell was manufactured by using the same processes as those used in Example 1 except that only the exposure temperature was changed to room temperature (25° C.).

Although this liquid crystal cell was observed under a polarization microscope, the presence of a striped structure as seen in the liquid crystal cells that was manufactured in Examples 1 and 2 was not confirmed. Further, although the operation of the present liquid crystal cell was confirmed in the same manner as Example 3, no domains along stripes were observed since no striped structure existed. Therefore, this arrangement failed to provide gray scale display.

In the present liquid crystal cell, although micro structural elements are formed, the micro structural elements do not exhibit isotropy. For this reason, the polymer in the micro structural elements are orientated together with the liquid crystal, with the result that no striped structure is formed.

Additionally, in the present comparative example, upon irradiation with ultraviolet light, the heating temperature was set to 25° C. at which the FLC composition exhibits a chiral smectic C phase ($S_C^*$ phase), and although another comparative example, in which upon irradiation with ultraviolet light, the heating temperature was set to 70° C. at which the FLC composition exhibits a smectic A phase ($S_A$ phase), was carried out, the presence of a striped structure was not confirmed in the same manner as the present comparative example.

The results of the aforementioned Example 1, Example 3 and the present comparative example are classified as shown in Table 2. In other words, in the case when the temperature (exposing temperature) upon irradiation with ultraviolet light was set to a temperature at which the FLC composition exhibits a nematic phase or to a temperature at which the FLC composition exhibits an isotropic phase (Example 1), a striped structure was formed. In contrast, in the case when the exposing temperature was set to a temperature at which the FLC composition exhibits a smectic phase (Comparative Example 1), no striped structure was formed.

Further, when the operations of these liquid crystal cells were confirmed by applying the driving voltage thereto, changes of domains as shown in FIGS. 10(b) through 10(f) were observed in the liquid crystal cell of Example 1, and changes of domains as shown in FIGS. 11(b) and 11(c) were observed in the liquid crystal cell of Comparative Example 1.

TABLE 2

|  | Exposing Temperature | | | |
| --- | --- | --- | --- | --- |
|  | 25° C. (S$_c$ Phase) | 70° C. (S$_n$ Phase) | 90° C. (N Phase) | 100° C. (I$_{so}$Phase) |
| Presence or Absence of Striped Structure | Absence | Absence | Presence | Presence |
| Change of Domains | (FIG. 11) | (FIG. 11) | FIG. 10 | FIG. 10 |

COMPARATIVE EXAMPLE 2

In the present comparative example, the processes up to the bonding process of the electrode substrates 9 and 10 were carried out in the same manner as those used in Example 1, and mixture D, which had components as shown in Table 3, was injected between the electrode substrates 9 and 10. Then, the liquid crystal cell is heated to 70° C. on a hot plate, and is irradiated with ultraviolet light that have a wavelength of 365 nm and an intensity of 8 mW/cm$^2$ for five minutes. After irradiation with the ultraviolet light, the heating process of the hot plate is stopped, and it is cooled off down to room temperature.

Additionally, the photopolymerizable monomer that was used in the present comparative example was not a monofunctional monomer.

TABLE 3

| Mixture | | D |
| --- | --- | --- |
| FLC Composition | SCE-8 (Merck & Co., Inc.) | 96 Wt % |
| Photopolymerizable Monomer | NOA-65 (Norland Inc.) | 4 Wt % |

In the liquid crystal cell that was manufactured as described above, it was confirmed by observation under a polarization microscope that the polymer disturbs the orientation of the FLC composition. For this reason, even if the driving voltage was applied to the present liquid crystal cell, it was impossible to drive the liquid crystal cell.

RESULTS

As described above, it was confirmed whether or not the formation of a striped structure was achieved depending on the difference in exposing temperatures. In other words, when exposure was made by using a smectic phase, neither a striped structure nor isotropic micro structural components were formed since the monomer was polymerized while being maintained in an orientated state in the smectic layers 31. Therefore, the domains in such a liquid crystal layer 12 change in the same manner as those in a commonly-used FLC composition (see FIGS. 11(b) and 11(c)).

In contrast, when exposure was made by using a nematic phase or an isotropic phase, the polymer itself, thus produced, is not orientated; therefore, isotropic micro structural elements are formed and the isotropic micro structural elements are further arranged into a striped structure during the succeeding cooling process. Thus, the domains in such a liquid crystal layer 12 change as shown in FIGS. 10(b) through 10(f). Moreover, even in the case of a monofunctional monomer with a low concentration, a striped structure can be obtained by re-heating it in an isotropic phase.

EMBODIMENT 2

The liquid crystal cell of the present embodiment has the structure shown in FIG. 1 in the same manner as the liquid crystal cell of Embodiment 1.

In this liquid crystal cell also, the liquid crystal layer 12 contains the aforementioned FLC composition and isotropic micro structural elements made of polymers. In this case, however, different from the isotropic micro structural elements described in Embodiment 1, the isotropic structural elements are not made by a polymer which has been formed by irradiating a monomer placed between the electrode substrates 9 and 10 with light, but made by a polymer which has been preliminarily polymerized. In other words, after having been mixed with the FLC composition, the polymer, which is to be used in the present embodiment, is loaded between the electrode substrates 9 and 10 by the method used in Embodiment 1.

With respect to the above-mentioned polymer, for example, materials such as polyacrylate, polymethacrylate and epoxy resins are listed. Each of these materials is a polymer of a monofunctional compound in which each molecule has one polymerized portion. Further, the above-mentioned polymers may be used individually, or may contain an optically active compound.

The mixture of the FLC composition and the polymer has a polymer content in the range of 0.1 to 10% by weight (more preferably in the range of 0.1 to 5% by weight) although the content varies depending on desired characteristics of the liquid crystal cell. In the case of a polymer content of less than 0.1% by weight, no striped organization can be obtained, failing to provide a gray-scale display. Further, in the case of a monomer content of not less than 10% by weight, disturbance in the orientation and degradation in the response characteristic tend to occur, thereby causing degradation in the display quality.

In the liquid crystal cell containing the above-mentioned polymer, it was also observed under a polarization microscope that there was an organization having a number of fine stripes that were aligned in a direction perpendicular to the normal to the smectic layers 31, as indicated by a broken line in FIG. 7(c). In the case of a low concentration of the polymer, it becomes difficult to form the above-mentioned striped organization after the mixture of the FLC composition and the polymer have been loaded. In this case, however, the above-mentioned striped organization can be formed by heating the mixture to a temperature that allows the FLC composition to exhibit the isotropic phase and cooling it naturally to room temperature.

The reason that even the isotropic micro structural elements having a low concentration forms a striped organization in this manner is because, during the cooling-off period, the isotropic micro structural elements are distributed in a sandwiched manner between the smectic layers 31, as illustrated in FIG. 7(b). Consequently, as illustrated in FIG. 7(b), a striped organization with pitches (10 to 20 μm) is formed.

When a pulse voltage as shown in FIG. 4 is applied to the liquid crystal cell, fine domains are generated in accordance with the striped organization. Here, as illustrated in FIG. 7(c), the striped organization is formed so finely within the region of 0.3 mm square constituting each pixel that display with gray shades is available in each pixel. At least either the area or the number of the domains is controlled by at least either the height V or the width τ of the pulse voltage.

Therefore, with the above-mentioned structure, the present liquid crystal cell containing the FLC composition easily makes it possible to carry out gray scale display in an analog form. Moreover, the combination of this liquid crystal cell with color filters also easily makes it possible to carry out full-color gray scale display in an analog form.

Next, referring to Examples 4 through 7, the present embodiment is explained in more detail.

EXAMPLE 4

The liquid crystal cell of the present example is manufactured as follows:

On the glass substrates 1 and 2, electrodes L and S, each made of ITO, are formed with a thickness of 1000 Å, and insulating films 3 and 4, made of $SiO_2$, are formed thereon with a thickness of 1000 Å by the spin coat method. Next, alignment films 5 and 6, made of polyimide, are applied thereon with a thickness of 500 Å, and a rubbing process is applied to the surfaces thereof.

Successively, spacers are dispersed onto the alignment films 5 and 6 so as to provide a cell gap of 1.5 μm, and the surrounding portions of the substrates 1 and 2 are bonded to each other by seal member 11. Further, mixture E, which is made by mixing an FLC composition with a polymer as shown in Table 4, is injected between the electrode substrates 9 and 10 by the vacuum injection method.

The polymer in mixture E, which is an optically active compound, that is, a S(sinister) compound, is contained at a ratio of 30%. This polymer, which is a polymer of the side-chain type that is formed by irradiating with light a monomer having one vinyl group ($CH_2$=CH—) as a photopolymerizable functional group, forms isotropic micro structural elements (polymer 32) as illustrated in FIG. 7(*a*), and has no liquid-crystal property.

Here, the FLC composition is SCE-8 used in the aforementioned Embodiment 1, and exhibits a negative dielectric anisotropy.

Measurements were carried out on the transmittance with respect to the change in the pulse voltage by applying a pulse voltage, shown in FIG. 4, to the liquid crystal cell. Upon measurements, the pulse voltage, which had a constant width τ (70 μsec), was applied with the height V being varied, and the resulting intensity of transmitted light was detected by a photodiode.

As a result, as illustrated in FIG. 8, characteristics in which the transmittance changes gradually were obtained; thus, it was confirmed that gray scale display was available by using the present liquid crystal cell.

EXAMPLE 5

In the present example, liquid crystal cells were manufactured through the same processes by using mixture F, shown in Table 4, instead of using mixture E in Example 4. The polymer in mixture F is an optically active compound (an S-compound), and was contained at a ratio of 1.5%.

Although observation was carried out on the liquid crystal cells thus obtained by using a polarization microscope, there was no structure having a number of fine stripes that were aligned in a direction perpendicular to the normal to the layers in the liquid crystal layer 12.

Next, these liquid crystal cells were heated to 100° C. so as to allow the FLC composition to exhibit a sufficient isotropic phase, and then they were cooled off.

In these liquid crystal cells thus obtained, it was observed under a polarization microscope that there was a structure having a number of fine stripes that were aligned in a direction perpendicular to the normal to the layers in the liquid crystal layer 12.

As described above, in the case when the concentration of the polymer exhibiting an optically active property in the mixture was low, it was found that a striped structure was formed by applying a heating process up to the temperature at which the FLC composition was allowed to exhibit an isotropic phase and then cooling it off.

EXAMPLE 6

In the present example, liquid crystal cells were manufactured through the same processes by using mixture G,

TABLE 4

| Mixture | | E (wt %) | F (wt %) | G (wt %) |
|---|---|---|---|---|
| FLC Comp. | SCE-8 (Merck & Co., Inc.) | 97.0 | 98.5 | 98.5 |
| Photopolymerization Monomer | —(CH—CH₂)ₙ— O ... | 3.0 *(S-Compound) | 1.5 *(S-Compound) | 1.5 Racemic Comp. |

*Optically Active Compound

In the liquid crystal cell thus obtained, it was observed under a polarization microscope that there was a structure having a number of fine stripes that were aligned in a direction perpendicular to the normal to the layers, as illustrated in FIG. 7(*c*).

shown in Table 4, instead of using mixture F in Example 5. The polymer in mixture G is a racemic compound, and was contained at a ratio of 1.5%.

Although observation was carried out on the liquid crystal cells thus obtained by using a polarization microscope, there was no structure having a number of fine stripes that were aligned in a direction perpendicular to the normal to the layers in the liquid crystal layer 12.

Next, these liquid crystal cells were heated to 100° C. so as to allow the FLC composition to exhibit a sufficient isotropic phase, and then they were cooled off.

In these liquid crystal cells thus obtained, it was observed under a polarization microscope that there was a structure having a number of fine stripes that were aligned in a direction perpendicular to the normal to the layers in the liquid crystal layer 12.

As described above, even in the case when the concentration of the polymer exhibiting an optically non-active property in the mixture was low, it was found that a striped structure was formed by applying a heating process up to the temperature at which the FLC composition was allowed to exhibit an isotropic phase and then cooling it off, in the same manner as examples 4 and 5 in which the polymers were optically active compounds.

EXAMPLE 7

In the present example, the operation of the liquid crystal cell that was manufactured in Example 4 is confirmed by applying a driving voltage as shown in FIG. 9.

Here, in the same manner as Example 3, the driving voltage was applied with the pulse width τ being changed (increased), and the resulting changes of domains in the liquid crystal layer 12 were observed. Consequently, the areas of domains were controlled in response to the change in the pulse width τ as shown from the bright state in FIG. 10(*a*) to intermediates states 1 through 5 in FIGS. 10(*b*) through 10(*f*); therefore, it was confirmed that gray scale display was available.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing method for a liquid crystal display element having a plurality of pixels and including a pair of insulating substrates, each having electrodes formed thereon, an alignment film that is formed in a manner so as to cover the electrodes, a liquid crystal layer that is interpolated between the substrates, each of the plurality of pixels being constituted of the paired electrodes that are aligned face to face with each other between the two substrates and the liquid crystal layer, wherein the liquid crystal layer contains liquid crystal molecules and isotropic micro structural elements that locally give different threshold-value characteristics to the liquid crystal molecules, and wherein the liquid crystal molecules are arranged so as to form smectic layers and the isotropic micro structural elements are arranged between the smectic layers so as to have a striped structure, the manufacturing method comprising the steps of:

bonding the insulating substrates to each other after aligning the pair of insulating substrates face to face with each other and after forming the alignment film in a manner so as to cover the electrodes; and filling a gap between the two substrates with a mixture that is made by mixing a liquid crystal composition with the isotropic micro structural elements that locally give different threshold-value characteristics to the liquid crystal molecules in the liquid crystal composition.

2. The manufacturing method of a liquid crystal display element as defined in claim 1, wherein the isotropic micro structural elements are isotropic micro structural elements which are formed into a striped organization by being mixed with the liquid crystal composition.

3. The manufacturing method of a liquid crystal display element as defined in claim 1, a polymer, which is made by polymerizing at least one kind of monofunctional monomer, is used as the isotropic micro structural elements.

4. The manufacturing method of a liquid crystal display element as defined in claim 1, wherein the mixture that has been filled between the paired substrates is heated to a temperature that allows the liquid crystal composition to exhibit an isotropic phase.

5. The manufacturing method of a liquid crystal display element as defined in claim 1, wherein a ferroelectric liquid crystal composition is used as the liquid crystal composition.

* * * * *